United States Patent [19]

Bakermans et al.

[11] 3,988,102
[45] Oct. 26, 1976

[54] CRIMPABLE PLASTIC BUNDLE TIE

[75] Inventors: Johannes Cornelis Wilhelmus Bakermans, Harrisburg; Ronald Bruce Barnes, Camp Hill; Richard Anthony Sywulka, Harrisburg, all of Pa.

[73] Assignee: AMP Incorporated, Harrisburg, Pa.

[22] Filed: Nov. 10, 1975

[21] Appl. No.: 630,480

[52] U.S. Cl. ............................. 425/394; 29/212 D; 29/243.56; 29/243.57; 100/33 PB; 24/16 PB
[51] Int. Cl.² ............................................ B29C 3/00
[58] Field of Search ................ 29/243, 564, 211 D, 29/212 D, 243.57, 203 DS, 203 H, 227, 140; 24/16 PB, 17 AP; 100/30, 33 R, 33 PB; 174/72 A; 425/394

[56] References Cited
UNITED STATES PATENTS

| 1,944,251 | 1/1934 | Mansbendel | 29/243.56 X |
| 3,391,440 | 7/1968 | Harms | 29/212 D X |
| 3,526,944 | 9/1970 | Cherup | 29/243.57 X |
| 3,628,230 | 12/1971 | Grise | 29/212 D |

*Primary Examiner*—Robert L. Spicer, Jr.
*Attorney, Agent, or Firm*—R. W. Pitts; F. W. Raring; Jay L. Seitchik

[57] ABSTRACT

A crimpable bundle tie is disclosed and claimed together with an applicator tool for attaching the bundle tie to a bundle containing a plurality of electrical wires. The bundle tie is generally U-shaped and its legs are inwardly deformed to envelop the wires. The applicator tool has a reciprocal anvil which moves towards a relatively stationary crimping means. The tool also has a number of reciprocal slides and levers for exerting a discontinuous force on the anvil during its travel. The anvil is spring-loaded so that the degree of deformation of the bundle tie is dependent upon the volume of wires enclosed.

10 Claims, 15 Drawing Figures

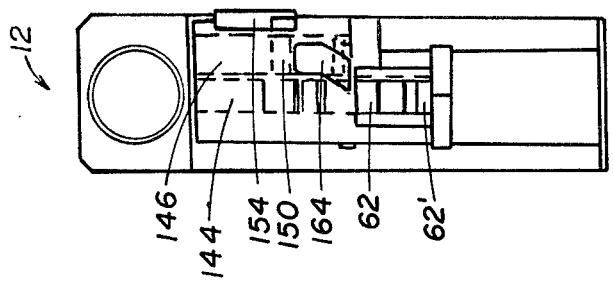
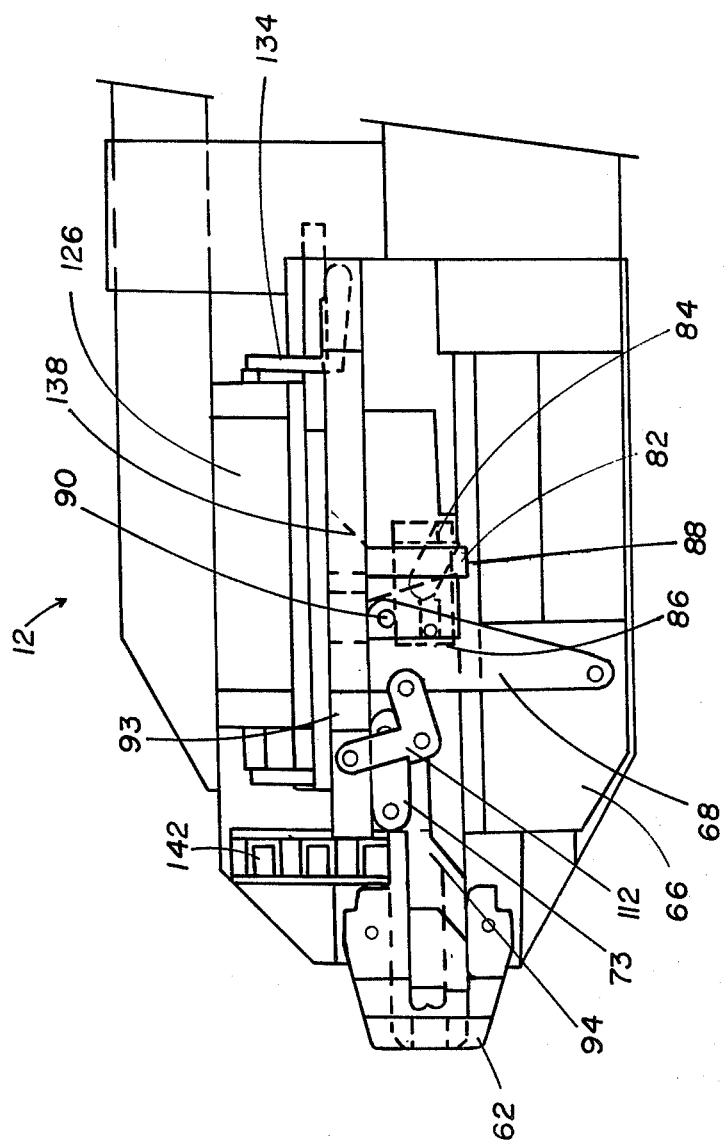

3,988,102

CRIMPABLE PLASTIC BUNDLE TIE

BACKGROUND OF THE INVENTION

1. Field of the Invention

The invention relates generally to a fastener for bundles of cylindrical members or strands, and, more specifically, to a clamp or bundle tie for use with insulated electrical wires. The bundle tie is applied by using an applicator tool having a movable anvil and crimping means for permanently deforming the bundle tie around a group of wires. Use of a deformable plastic bundle tie together with an appropriate tool furnishes an appropriate method for constructing an electrical harness.

2. Description of the Prior Art

Numerous clamps or bundle ties for use with electrical wires are disclosed by the prior art. Generally, these bundle ties comprise flexible plastic bands each of which has some form of locking tab member. The flexible band is laced through the locking tab member and the excess is trimmed off. U.S. Pat. No. 3,694,863 is an excellent example. Generally, these bundle ties are flexible and are not permanently deformed when applied. U.S. Pat. No. 2,335,296 shows an insulating clamp which is deformed around a tubular member. This thermo-plastic clamp is heated and then formed around the tubular member and serves as an elevation post. U.S. Pat. No. 3,571,863 shows a metallic wire member which is bent around a number of electrical wires. This latter metallic member has a plastic cover. The instant invention comprises a relatively rigid, plastic, insulating member which can be deformed around a bundle of wires in much the same way as a metallic terminal can be crimped to the core of an insulated wire. Electrical harnesses, such as those disclosed in U.S. Pat. No. 3,082,984 can be formed by using these plastic bundle tie members at appropriate points in the harness.

This invention differs from the prior art in that the deformed plastic bundle tie is a one-piece member which does not require any special locking mechanism. There is no necessity for a metallic structural element to carry the tensile loads since the plastic member is sufficiently thick to carry these loads. This U-shaped bundle tie offers a device which can be utilized with no scrap and the molding operation is relatively simple when compared to the relatively more complex devices necessitating locking means and collars. Additionally, the application tooling required for this device can be much simpler than that required for bundle ties where the flexible band must be looped around a bundle of wires. Only a reciprocating anvil and a relatively stationary crimping means is required. Of course, a small tool for hand-held operation must necessarily be more complex as is the tool herein disclosed and claimed.

BRIEF SUMMARY OF THE INVENTION

A deformable plastic bundle tie member which can be crimped about a number of electrical wires to form a coherent bundle is disclosed and claimed. This bundle tie is crimped about a bundle by using a tool having a movable anvil which deforms the sidewalls of the U-shaped bundle tie by forcing the bundle tie against an appropriate crimping surface. The wires are placed between the crimping surface and the anvil, and as the sidewalls are deformed, they envelop the wires. The anvil can only develop a certain predetermined force which is greater than the force required to deform the sidewalls of the bundle tie, but which is less than the force which would excessively damage the insulation on the wires. The tool and the bundle tie can then be used with wire bundles having varying cross-sectional areas. The number and size of the wires need not always be the same. The simple motion of the associated tooling leads inevitably to an appropriate method of forming harnesses of electrical wires.

The objects of this invention include the use of a one-piece deformable, plastic U-shaped member as a bundle tie for a group of electrical wires. This bundle tie would have no sharp edges and could accommodate a varying number and volume of wires with no scrap. A simple pressure-sensitive tool with only linear movement incorporated in the crimping means could be used to apply the tool. A tool of somewhat greater complexity, but which is relatively compact and capable of being hand-held and operated could also be used with this bundle tie. Such tooling would be capable of deforming the legs of a plastic bundle-shaped member without the necessity of heating the bundle tie. A simple harnessing method would thereby result.

BRIEF DESCRIPTION OF THE DRAWINGS

FIG. 10 is a side view of the crimping tool in its fully extended position.

FIG. 11 is a front view of the crimping tool.

DETAILED DESCRIPTION OF THE DRAWINGS

Figure 1:
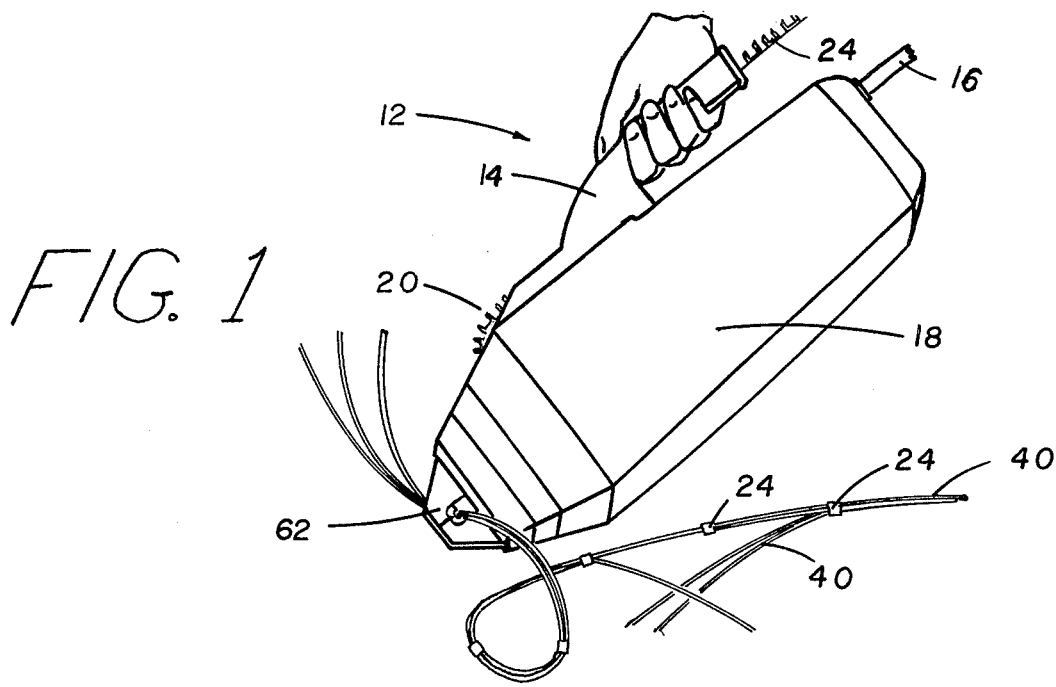
FIG. 1 shows a hand tool used for applying bundle ties to individual strands, such as electric wires.

FIG. 1 shows a hand-held applicator tool 12 used to crimp individual bundle ties 24 onto a plurality of electrical conductors 40. An air line 16 leads into the rear of the pneumatic tool 12. A carrier strip 20, on which individual bundle ties are mounted, enters the rear of handle 14. This strip is then fed into the front of tool 12 and ultimately each individual bundle tie is crimped by crimping jaws 62.

Figure 2:
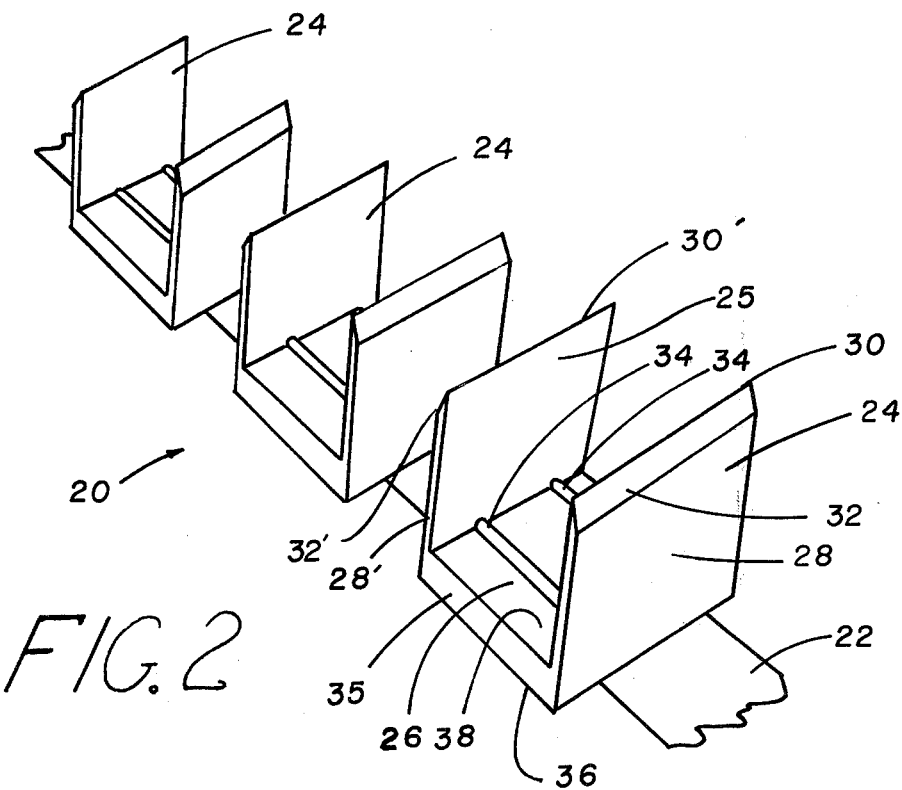
FIG. 2 shows a bundle tie strip assembly in which individual bundle ties are mounted on a continuous carrier strip.

FIG. 2 shows a bundle tie carrier strip assembly 20 which has individual bundle ties 24 mounted on a continuous carrier strip 22. Each bundle tie 24 is composed of a plastic material, such as polysulfone. This bundle tie is generally U-shaped havig a base 26 with opposed, upstanding sidewalls 28, 28' extending from the base. Each individual sidewall has a free end 30, 30' and the sidewalls and the base form a wire-receiving channel 25. Carrier strip 22 extends along the lower surface 36 of base 26. The bundle ties are bonded to the carrier strip. Each bundle tie may be severed from the carrier strip when it is crimped around wires 40. The upper surface 38 of base 26 has two cylindrical ridges 34, 34' extending from opposed sidewalls 28, 28'. Ridges 34, 34' are recessed from the side edges 35, 35' of the base of the bundle tie. In this embodiment, each sidewall has a tapered portion 32, 32' adjacent to free ends 30, 30'.

Figure 7:
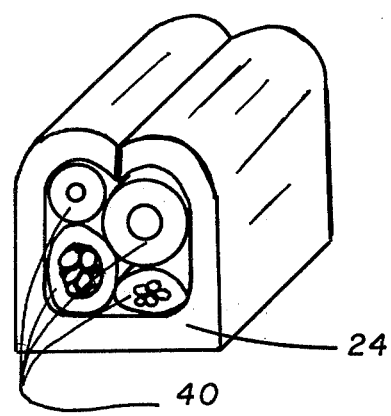
FIG. 7 is a cross section showing a number of wires in a simple bundle tie.
Figure 8:
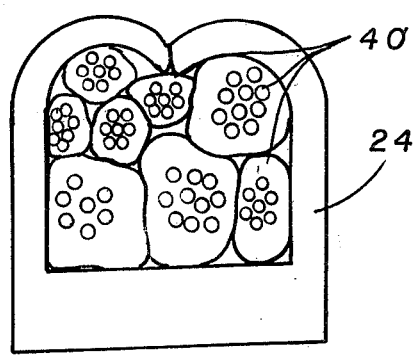
FIG. 8 shows a cross section demonstrating the deformation of wires captured by the bundle tie.

Basic bundle tie 24 is intended to secure a bundle of wires when it is crimped around the bundle and thus permanently deformed. The U-shaped member may be deformed to such an extent that the free ends 30 and 30' are turned inwardly toward the base as shown in FIG. 7 or they may be deflected only to the extent that they meet each other as shown in FIG. 8. The extent, of course, depends upon the volume of wires within the bundle. The tie itself must then be deformable, since in its simplest version no other locking means is available. The material used to form bundle tie 24 must be an insulating material to prevent accidental electrical shorts. Additionally, the material must be malleable. The bundle tie is to be crimped by a cold forming operation and no external heat is to be added. This limitation is significant since simplicity is a necessary element of any wire bundling scheme incorporating this invention.

Permanent deformation of bundle tie 24 depends not only upon the material chosen, but also on the shape of the basic member. The U-shaped member is to be deformed by the action of an anvil moving along an axis parallel to the sidewalls 28 and 28' of member 24. The sidewalls are then inwardly deformed. The tendency of sidewalls 28 and 28' to return to their original positions and release one or more wires from the bundle must be minimized. This requirement dictates that deformation of the sidewalls be confined, to as great a degree as possible, to the area near the free ends 30 and 30' of the sidewalls. The same degree of relaxation occurring at the free ends will result in less spring back that would occur if this relaxation were localized in an area of deformation near the base of the U-shaped member. One way to accomplish this result is to taper the sidewalls so that they are thicker near the base 26 than at free ends 30 and 30'. These same considerations again enter into the choice of a material for this device. A material which will minimize creep must be chosen to reduce any tendency for relaxation of the bundle tie.

Figure 3:
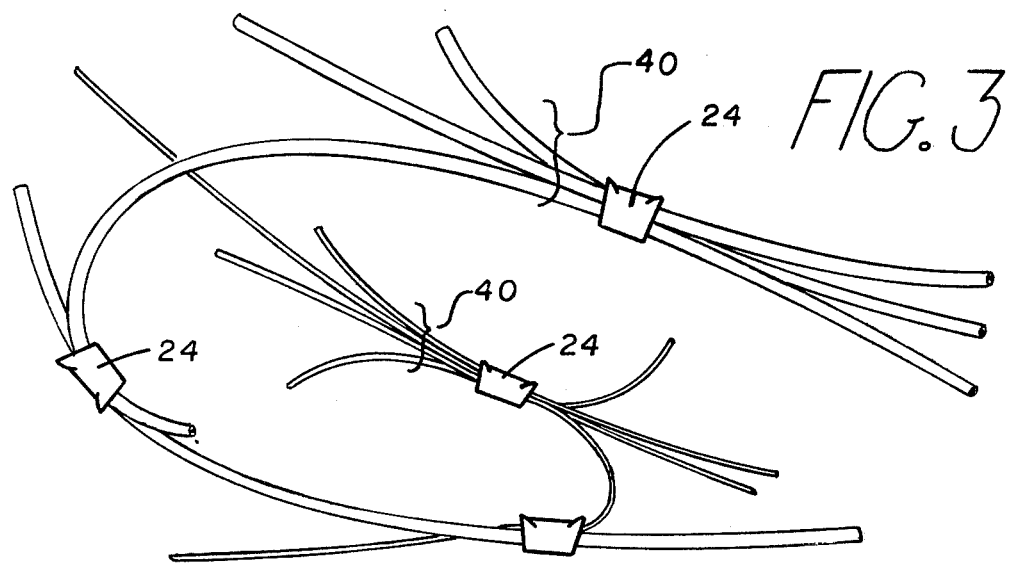
FIG. 3 shows a harness with numerous bundle ties applied to the component wires.

FIG. 3 shows a harness formed by crimping individual bundle ties 24 about wires 40, which are shown as having different diameters. Examination of FIG. 3 reveals that each bundle tie may be used with a varying number of conductors 40. In constructing a harness of electrical wires, it will often be necessary to apply a bundle tie around groups of wires, each group having a different volume. One of the key elements of this invention is that the crimpable plastic bundle tie 24 can be used with a range of $p$ wire sizes and a varying number of wires. In other words, the volume of the material to be enclosed by the bundle tie need not be constant.

Figure 4:
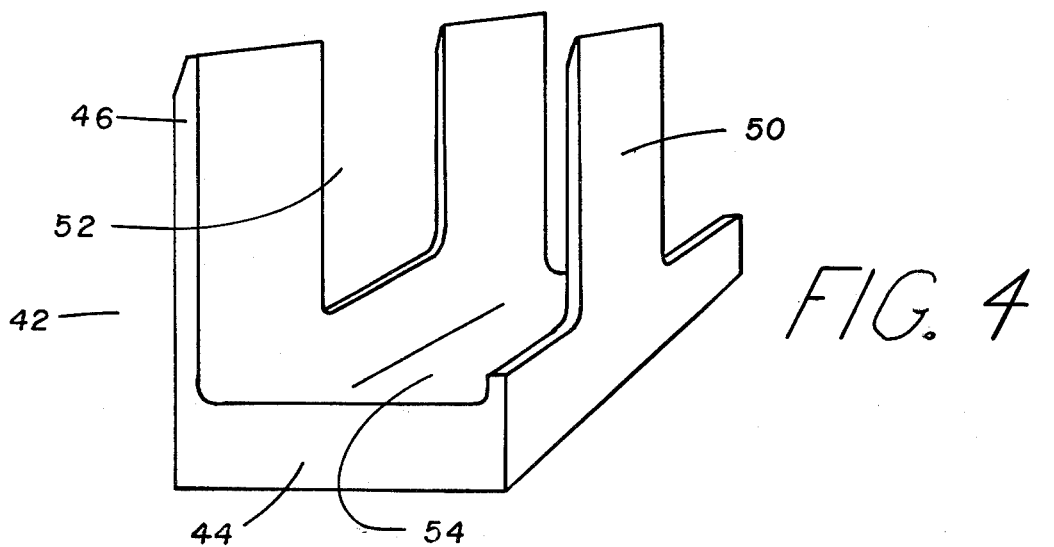
FIG. 4 shows an alternate embodiment of the bundle ties having interlocking sidewalls.
Figure 5:
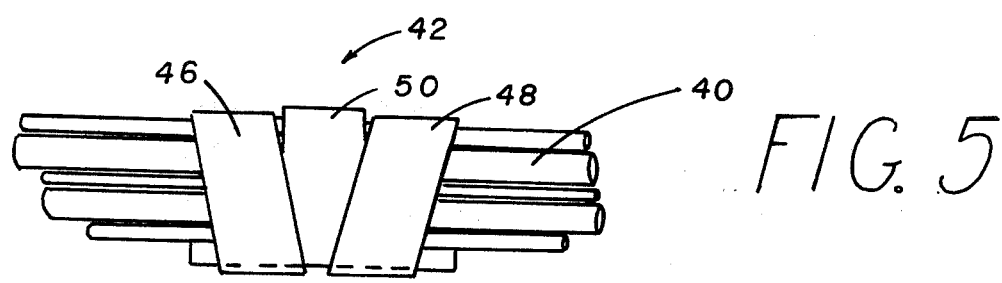
FIG. 5 shows the embodiment of FIG. 4 crimped around a plurality of wires.
Figure 12:
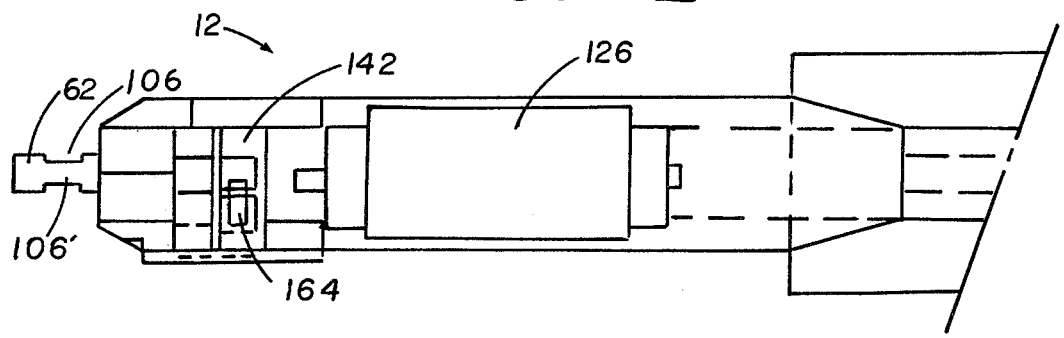
FIG. 12 is a top view of the crimping tool.

FIG. 4 shows an alternate embodiment 42 of the crimpable plastic bundle tie. Bundle tie 42 has two sidewalls 46 and 48 on one side of base 44. These two sidewalls are spaced-apart leaving an opening 52. A third sidewall 50 is located immediately opposite opening 52 and is approximately the same size as opening 52. Wire channel 54 extends between the opposite sidewalls. FIG. 5 shows bundle tie 42 after it has been crimped around wires 40. Sidewalls 46 and 48 have been deflected longitudinally towards each other and it can be seen that these sidewalls overlap sidewall 50 so that an interlocking effect is imparted to the sidewalls.

Figure 6:
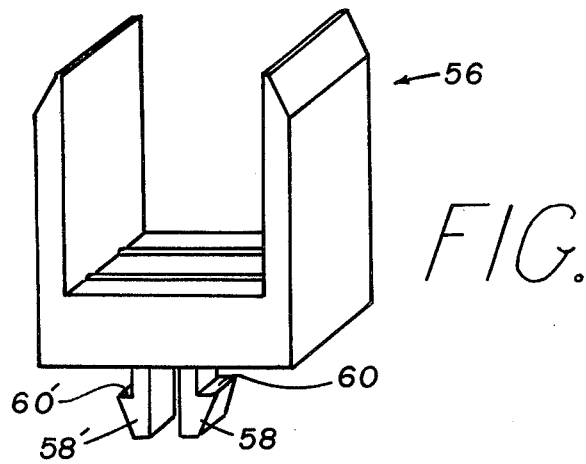
FIG. 6 shows an alternate embodiment in which the bundle tie has a mounting tab.

FIG. 6 shows a slightly different embodiment of a basic bundle tie. Bundle tie 56 has releasable tabs mounted on the lower surface of the base of the bundle tie. These tabs 58, 58' are cantilevered members with an inclined lower surface and lacking surface 60, 60'. These tabs may be inserted into appropriate holes and the bundle tie is in that way mounted on a harness board.

FIGS. 7 and 8 are cross-sectional views of a basic bundle tie which has been crimped around wires 40. When the bundle tie has been crimped around a plurality of wires, free ends 30, 30' meet near the center of the base. FIG. 8 shows a number of stranded wires which are enclosed in a crimped bundle tie. It is apparent that there has been some deformation in both the wires and their insulation. The deformation is not, however, sufficient to damage the insulation on any of the conductors. It should also be apparent from this figure that a metal bundle tie shaped like the basic bundle tie 24 would not be appropriate. A metal bundle tie would more likely damage the insulation and cause a resulting electrical short.

The bundle tie in FIG. 7 has been longitudinally deformed during the crimping process. The deformation results from a longitudinally uneven application of crimping forces. A greater force is applied to the center of the bundle ties than is applied near its ends. This localized deformation, when applied in the presence of cylindrical ridges 34, 34', provides a stronger grip on the captured wires. FIG. 7 also shows more conductors on one side of the crimped bundle tie than on the other side. This represents one possible deployment of the wires within the bundle tie. When sidewalls 28, 28' are crimped, they will tend to separate the captured wires if the free ends turn inwardly toward the base. Depending upon the initial alignment of the wires, this separation may take any of a number of forms. When more wires are located on one end, this one end will determine the degree of deformation of the bundle tie. A constant crimping pressure is envisioned for use in this process. The volume of wires to be crimped will determine the pressure.

Figure 9:
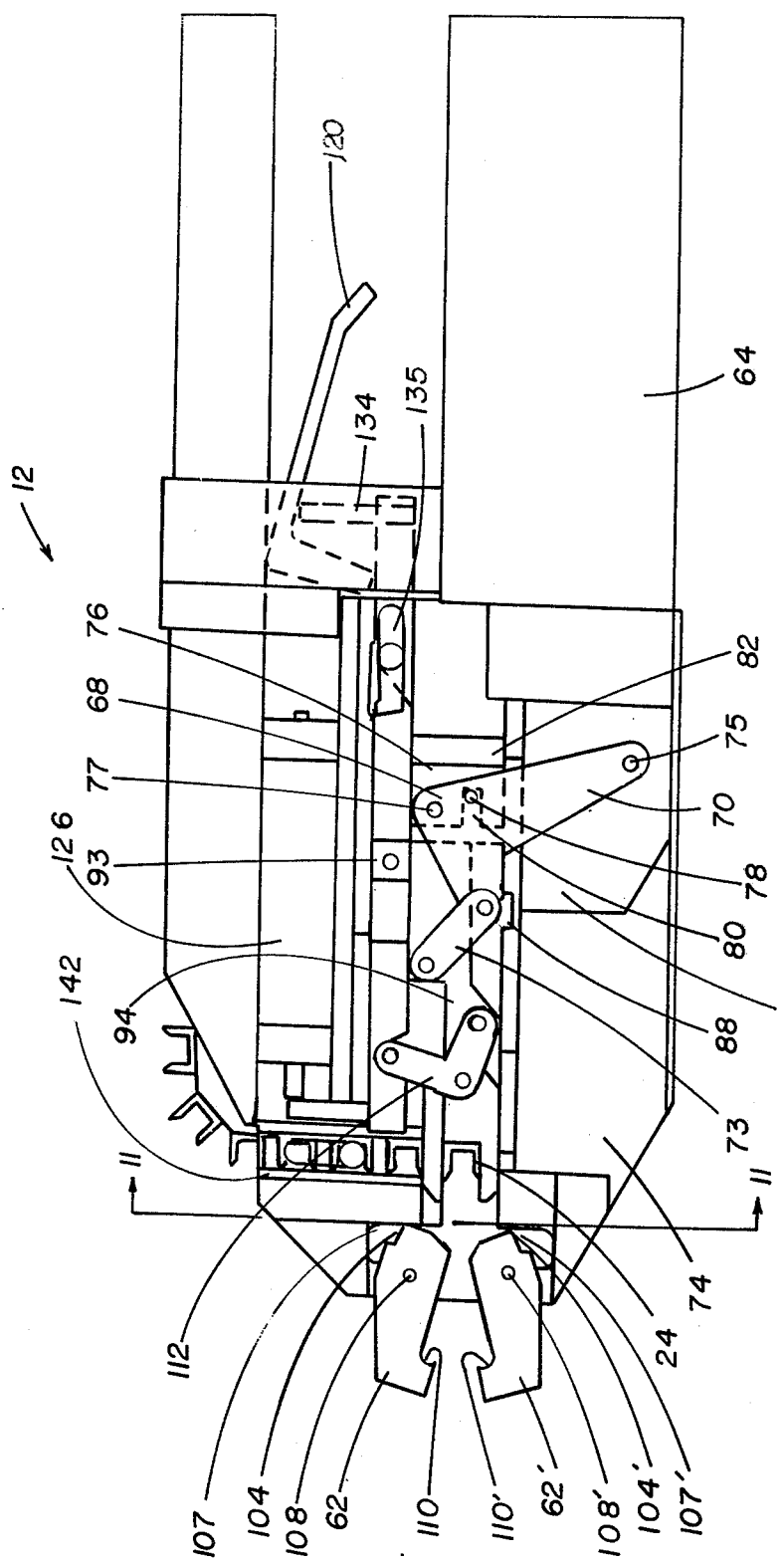
FIG. 9 is a side view of the crimping tool in the retracted position.

A hand-held applicator tool is desirable for attaching these crimpable plastic bundle ties to electric wires in a harness. FIG. 9 shows a relatively small tool capable of crimping simple bundle ties around the wire. This particular tool is comprised of three basic component assemblies. The first of these three assemblies is a mechanism for actuating the air cylinder which powers the tool. An anvil mechanism transmits the necessary crimping force. The third assembly is a bundle tie carriage and feed system.

The outer cover or housing 18 has been removed so that the internal components of the tool can be seen in FIGS. 9 and 10. Air cylinder 64 powers this tool. An actuating or first ram 66 is mounted on the left of air cylinder 64 as shown in FIG. 9. The Ram 66 moves along a track or passage 74. This Ram has a constant stroke, the length of which can be seen by comparing FIGS. 9 and 10. Toggle lever means 68 comprises an L-shaped lever 70 and an intermediate lever 73. L-shaped lever 70 has a lower, longer arm 72, and an upper shorter arm 71. L-shaped lever 70 is attached to actuating Ram 66 at its lower end by means of a pin. The upper end of L-shaped lever 70 is attached at pivot 77 to second ram 76. Second ram 76 has a cam 86 mounted therein. Pin 78 is attached to cam 86 and extends through a guide 80 to L-shaped lever 70. Pin 78 is attached to lever 70 at a point between pivot 77 and pin 75. A bar 82 is located in second ram 76 immediately adjacent to the location of pin 78. This bar is free to move in a vertical direction. Cam follower 84 is attached to bar 82 and is free to move in cam track 85. Bar 82 is not free to move horizontally with respect to second ram 76.

Figure 13:
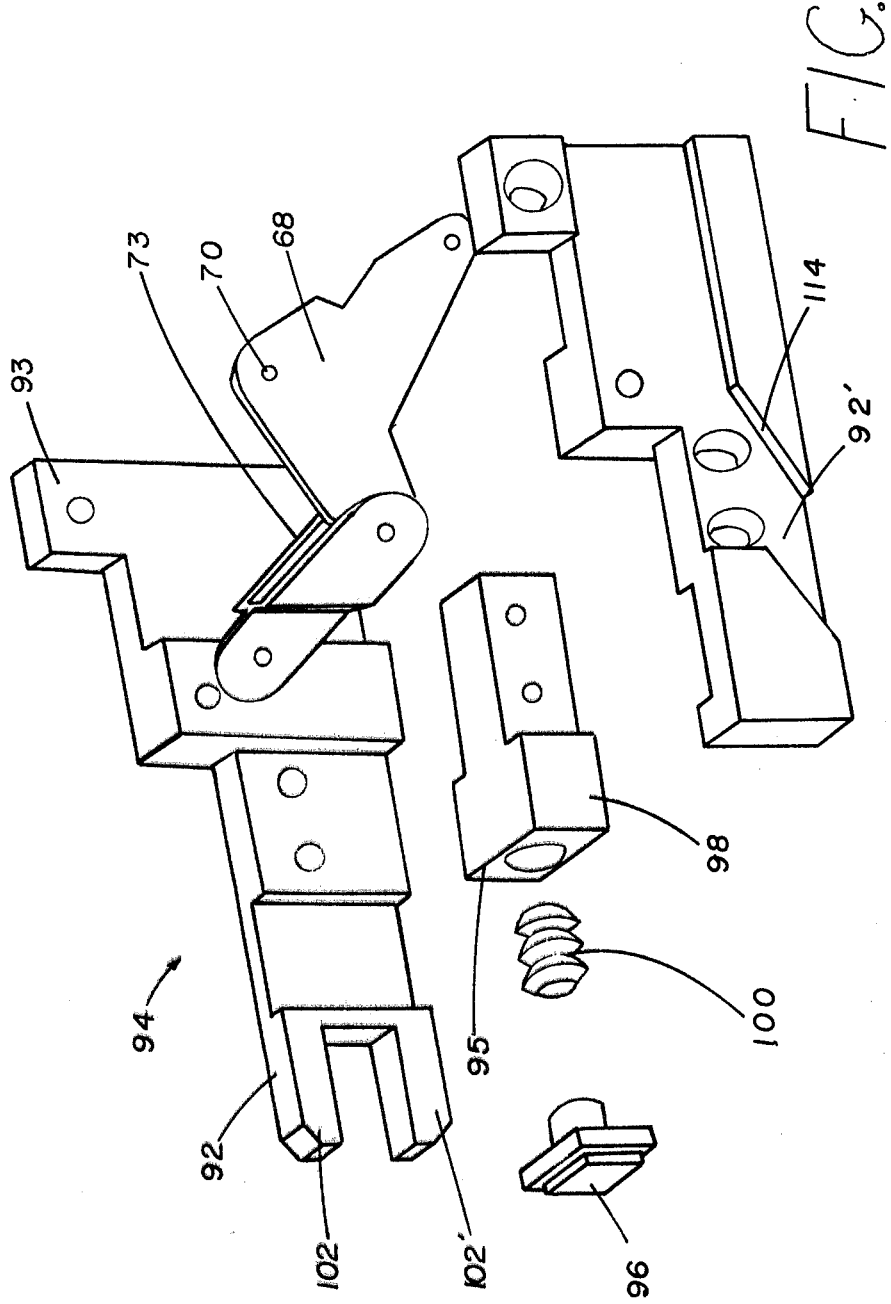
FIG. 13 is an exploded view of the anvil.

Intermediate lever 72 is attached at the end of short arm 71. These two levers are free to rotate about this point. The other end of intermediate lever 72 is attached to anvil 94. Anvil 94 has opposed side plates 92, 92' which can be seen in FIG. 13. Anvil 94 has a working face 96 adjacent to its forward end. Working face 96 can be mounted in hoder 98 which is then mounted between side plates 92, 92'. A set of disc springs 100 is mounted between working face 96 and holder 98. Side plate 92' has two parallel jaw cam arms 102, 102'. These two cam surfaces act to close jaws 62, 62'. Each jaw has a cam follower 104, 104' at its rearward extremity. Movement of surface 102, 102' past this cam follower and causes it to move into grooves 107, 107'. The jaws then pivot about points 108, 108' into a closed position. Each jaw has an internal concave surface and these surface define an internal cavity when the jaws are closed. Wires may be positioned in this internal cavity or opening.

Upon activation of air cylinder 64, actuating Ram 66 moves to the left as seen in FIGS. 9 and 10. Initial movement of Ram 66 is accompanied by the same movement of second ram 76. The action of pin 78, guide 80, and holder 82 prevents rotation of lever 70 about pivot 77. Rotation of lever 70 with respect to lever 73 is likewise prevented. Anvil 94 also begins its movement to the left. A recess 88 is located in between the retracted and fully extended positions. When holder 82 reaches this recess, it drops into the recess, further preventing movement of second ram 76. At this point, lever 70 is free to rotate about pivot 77. Further movement of piston 66 causes a clockwise rotation of lever 70 and a resulting rotation of lever 73. The force transmitted to anvil 94 is magnified in this manner. During the latter movement of anvil 94, the force transmitted thereto is greater than the force during its initial movement. A single bundle tie 24 which has been positioned in front of mounting face 96 is then driven into the opening defined by concave surfaces 110, 110'. The sidewalls of the bundle tie are deformed inwardly by these concave surfaces so that they envelop any wires in the opening. During initial movement of anvil 94, high forces are not required. It is only necessary that a bundle tie be moved toward the crimping jaws and severed from carrier strip 22. Neither function requires high forces. It is only during the actual crimping operation that significant force is required.

One potential crimping method would have anvil 94 traversing a constant stroke. For this application, however, a fixed stroke is not desirable. It is desirable that the stroke of working face 96 be governed by the volume of wires to be crimped. Use of disc springs 100 allows regulation of the stroke of working face 96. When a given resistance is exerted by the crimped bundle tie and wires against working face 96, further movement of working face 96 is prevented, since spring 100 flexes during the final stages of anvil movement. This given resistance is equal to a predetermined force which is less than the force exerted by anvil 94 after rotation of levers 70 and 73. In this way, a given size bundle tie can be used for crimping different wire bundles, each having the different cross sectional areas. The degree of deformation of sidewalls 28, 28' depends on the volume of the wires to be crimped.

Figure 14:
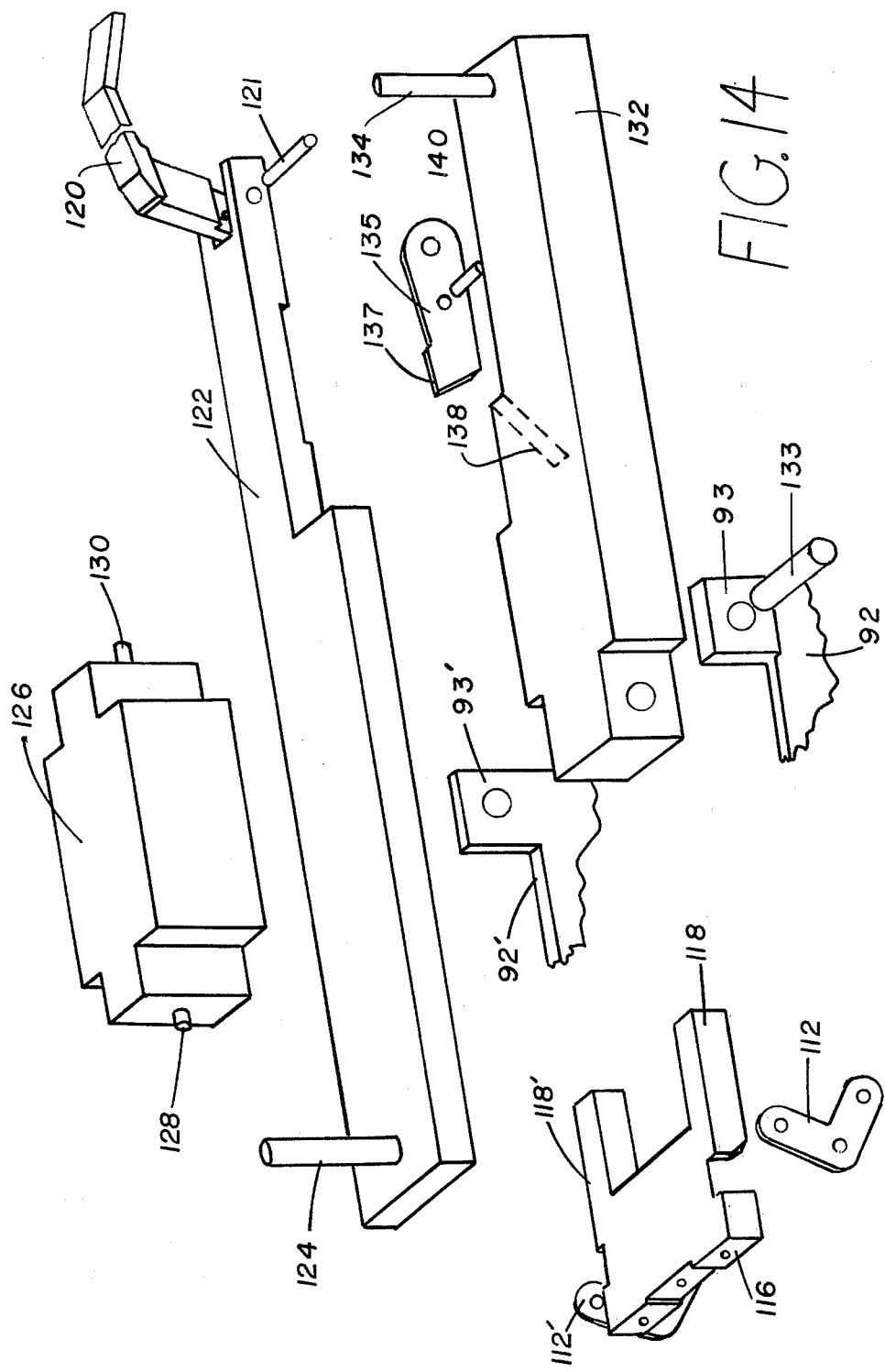
FIG. 14 is an exploded view of a mechanism for actuating the air cylinder.

FIGS. 9, 10, and 14 show the operation of the mechanism for actuating air cylinder 64. A detent valve 126 is located near the top of the tool with its axis parallel to anvil 94. Valve 126 has front stem 128 and a rear stem 130. The longitudinal position of this stem determines the position spool in valve 126. A generally rectangular slide member 122 is located below valve 126. Member 122 serves as the valve stem actuator slide. An upright member 124 is located on the extreme left of slide 122 as viewed in FIG. 14. Member 124 is aligned with stem 128. Trigger 120 is attached to the extreme right end of slide 122 by means of pin 121. Slide 122 is of generally constant width with the exception of recess 123 near the right end. A second recess 136 is located along the lower surface of slide 122, again, at its right end. A second slide 132 is located immediately below slide 122. Second valve stem actuator slide 132 is shorter than slide 122. Upright valve stem actuator 134 is located at the extreme right of slide 132 and is, in all respects, similar to member 124. An inclined cam surface 138 is located along the rear of slide 132 as seen in FIG. 14. Slide 132 is attached to anvil side plates 92, 92' at its extreme left end. The pin 133 extends through tabs 93, 93' and through an appropriate hole in slide 132. Although not part of the valve actuating means, carriage advance member 116 is shown in FIG. 14. It should be apparent that the carriage advance member 116 is located in front of slide 122 and is attached to anvil side plates 92, 92' by means of levers 112, 112'. A small lever 135 is located adjacent to recess 137 at its left end. Normally, cam surface 138 keeps locking surface 137 from engaging recess 136. When slide 132 moves to the left, locking surface 137 is free to rotate clockwise. If trigger 120 is released causing slide 122 to move to the left, locking surface 137 will engage recess 116 and prevent double triggering during the cycling of the tool.

FIG. 9 shows the initial position of the tool prior to activation of air cylinder 64. Movement of trigger 120 in a counterclockwise direction causes side 122 to move to the right. This movement causes upright member 124 to depress valve stem 128 and so shifting the spool position inside the valve to allow the piston in cylinder 64 to drive Ram 66 to the left. The valve is then in a position so that cylinder 64 can drive ram 66 to the left. As disclosed earlier, movement of ram 66 causes anvil side plates 92, 92' to move to the left. Slide 132 is also moved to the left and upon completion of the stroke of anvil 94, upright member 134 will depress valve stem 130. Depression of valve stem 130 causes the valve spool to shift so that the piston in air cylinder 64 is returned to its original position with ram 66 and anvil 94 likewise being returned to the retracted position shown in FIG. 9.

Figure 15:
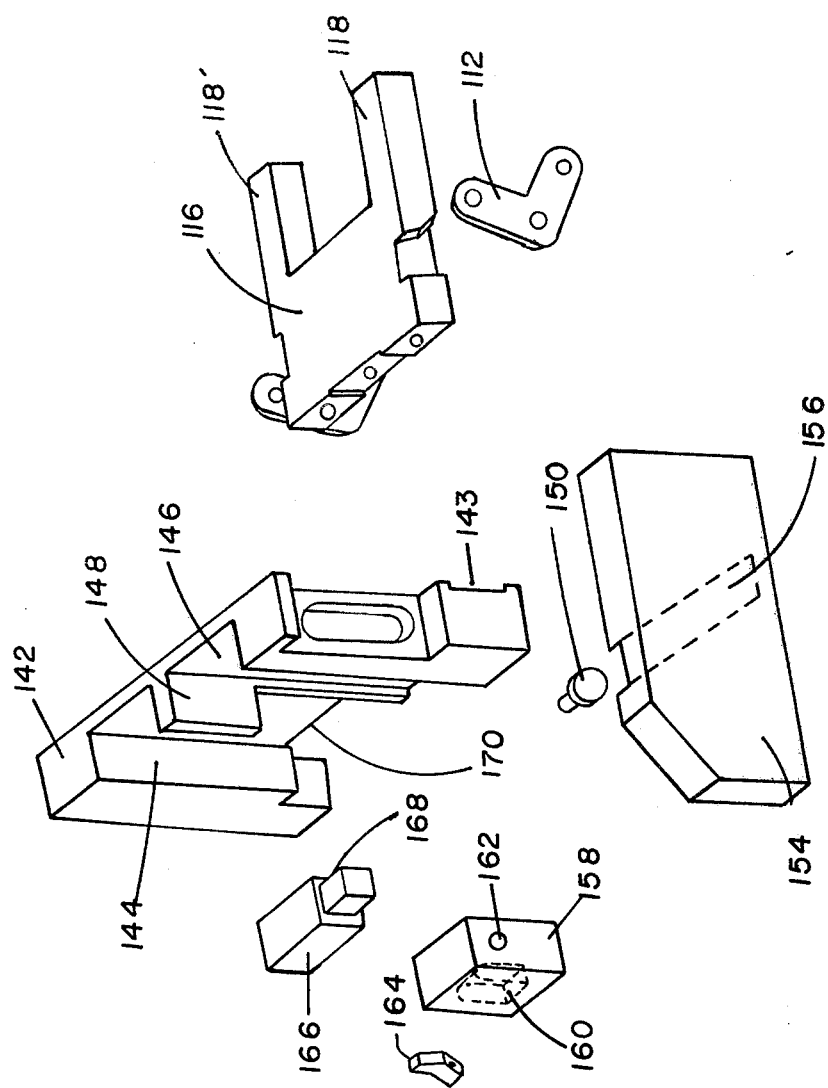
FIG. 15 is an exploded view of the bundle tie carriage and feed system.

The bundle tie carriage and feed system is shown in FIGS. 9, 10 and 15. Carriage advance member 116 is attached to anvil 94 by means of levers 112, 112'.

Movement of anvil 94 to the left causes a slight movement of member 116 also to the left. The front portion of member 116 abuts carrier strip advance member 142 in channel 143. Carrier strip advance member 142 is generally rectangular and has two parallel channels 144 and 146 extending inwardly from its left face. These channels extend vertically as seen in FIG. 15. Bundle tie carriage strip assembly 20 extends through channel 144. Channel 145 serves as a feed finger channel. Feed finger 164 is mounted on recess 160 in block 158. Block 158 is dimensioned to move vertically within channel 146. A pin 150 extends through slot 152 and is mounted in hole 162. The opposite end of pin 150 is located in a cam follower track 156 located in plate 154. As carriage advance member 116 causes carrier strip advance member 142 to move to the left, pin 150 and cam follower moves upwardly along track 156. This causes block 158 to rise in channel 146. Feed finger 164, which is spring-loaded, can then engage the next bundle tie located on strip 22. As member 142 moves back to the right, feed finger 164 will move down bringing the next bundle tie into position.

That portion of carrier strip 22 which is located between adjacent bundle ties 24 must be slugged out before each tie can be crimped. A stationary cutter 166 having upper and lower cutting edges 168 and 168' cooperates with two movable cutting edges to slug out this intermediate carrier strip portion. An upper movable cutting edge 170 is fixed to carrier strip advance member 142. This upper cutting edge 170 moves past stationary upper cutting edge 168 to sever the strip immediately below the bundle tie immediately above the anvil 94. Edge 95 on anvil 94 serves as a lower movable cutting edge. Edge 95 moves past lower stationary cutting edge 168' to sever the carrier strip immediately above a bundle tie which is located in front of anvil 94 and which will momentarily be crimped around a bundle of wires.

A number of modifications can be incorporated in the bundle tie and the tool disclosed without departing from the scope or coverage of this invention. For example, the rotatable jaws forming the crimping means can be replaced by a stationary crimping jaw which has a gap through which the wires may be laced into alignment with the anvil. A tool which is not as complex as that disclosed and claimed herein also can be used to crimp this bundle tie. The complexity inherent in the disclosed tool stems from the fact that it is a small hand-held tool. A much larger tool could operate with basically a single reciprocal anvil. It should be apparent that a bundle tie mounted in a continuous strip form can be combined with such a reciprocal applicator tool to provide an effective method of securing the conductors in an electrical harness at a number of points. Since this bundle tie does not have to be wrapped or looped around the wires in a harness, it can be used in a confined space. This is advantageous when a harness having multiple branches in a confined space needs to be constructed. The embodiments disclosed together with numerous other embodiments comprising only modifications of this invention are covered by the following claims.

We claim:

1. An apparatus for crimping a deformable, plastic, generally U-shaped member, having a base and oppositely facing sidewalls, about a plurality of individual strands of wire or the like, said apparatus comprising:

a reciprocal anvil movable along a predetermined path from a retracted to a fully extended position, said anvil having a working face, actuating means for moving said anvil along said predetermined path, crimping means located along said predetermined path, said crimping means being positioned in the vicinity of the fully extended position of said anvil, a forward end on said crimping means, said forward end being opposed to said working face of said anvil and comprising at least one concave surface, an opening on said crimping means between said forward end and said anvil so that said strands can be laced through said opening with the axis of said strands extending transverse to said path traversed by said anvil.

pressure sensitive means on said anvil, said pressure sensitive means preventing travel of said mounting face toward said forward end of said crimping means upon the build up of a predetermined force acting on said working face in the direction opposed to the movement of said anvil, a loading station, said loading station being located between the retracted and fully extended positions of said anvil, said loading station having loading means for placing one of said U-shaped members between said anvil and said crimping means with said base of said U-shaped member being positioned against said working face, whereby said U-shaped member is driven toward said crimping means with said sidewalls being deformed by said concave surfaces so that said sidewalls envelop said strands, with the force available to deform said U-shaped member being limited to said predetermined force so that the extent of deformation of said sidewalls will depend upon the number and volume of said strands.

2. An apparatus as set forth in claim 1 wherein said crimping means comprise two hinged rotatable opposed jaws, said jaws being movable between an open and a closed configuration so that said strands may be placed in said opening when said jaws are in said open configuration and said sidewalls may be deformed around said strands when said jaws are in said closed configuration.

3. An apparatus as set forth in claim 2 wherein said jaws have camming surfaces thereon, said camming surfaces being engageable with appropriate surfaces on said anvil so that said jaws are cammed into said configuration by movement of said anvil.

4. An apparatus as set forth in claim 1 wherein said loading means comprise means for advancing a continuous carrier strip, having a plurality of said U-shaped members thereon, so that successive individual shaped members are positioned against said mounting face on said anvil.

5. An apparatus as set forth in claim 4 wherein said anvil has a cutting edge located thereon which severs said carrier strip upon movement of said anvil past said loading station.

6. An apparatus as set forth in claim 1 whrein said actuating means comprises driving means for exerting a discontinuous driving force to drive said anvil from said retracted position to said fully extended position, said driving force being less than said predetermined force for the initial travel of said anvil and said driving force being at least equal to said predetermined force for the final segment of the travel of said anvil from said retracted to said extended position.

7. An apparatus as set forth in claim 6 whrein said actuating means comprises first and second reciprocal rams, said first ram traversing a path greater than the path traversed by said second ram, said first ram, said second ram and said anvil being connected by toggle lever means.

8. An apparatus as set forth in claim 7 wherein said second ram prevents said toggle lever means from rotating during movement of said second ram, said toggle lever means being free to rotate upon continued movement of said first ram and said anvil after said second ram has come to rest, rotation of said toggle lever means resulting in amplification of said driving force exerted on said anvil.

9. An apparatus as set forth in claim 8 wherein said second ram moves along a path colinear with said predetermined path traversed by said anvil and said first ram traverses a separate path which is parallel to said predetermined path.

10. A pneumatic application tool for crimping a generally U-shaped member about a plurality of individual strands of wire or the like, said application tool comprising:

crimping means, said crimping means comprising at least one concave surface, a first actuating ram driven by a piston in an air cylinder and movable along a first path towards and away from said crimping means, from a retracted position to an extended position, said first path having a constant predetermined length, said first path being offset from said crimping means.

an anvil, said anvil being movable towards and away from said crimping means along a second path aligned with said crimping means, and parallel to said first path the length of said second path being constant and being less than said predetermined length, a working face on said anvil, said working face being spring-loaded so that movement of said working face towards said crimping means is prevented when a predetermined resistance is exerted against said working face, so that said working face does not traverse a constant path, a valve for shifting the air pressure exerted on said piston, said valve having a spool which is activated by movement of a valve stem, said valve stem being parallel to said first and second path, a valve actuating slide, said valve actuating slide being attached to said anvil so that said slide moves with said anvil, and a valve stem actuator attached to said slide so that said valve stem actuator depresses said valve stem when said first ram is in said extended position, thereby shifting said spool and reversing the pressure on said piston and returning said first ram and said anvil to said retracted position, whereby said U-shaped member may be placed between said working face and said crimping means and crimped around said plurality of strands to form a bundle.

* * * * *